United States Patent
Shao et al.

(10) Patent No.: US 12,009,992 B2
(45) Date of Patent: Jun. 11, 2024

(54) METHODS AND SYSTEMS FOR HIERARCHICAL PROCESSING OF GAS DATA BASED ON SMART GAS INTERNET OF THINGS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yong Li, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/466,050

(22) Filed: Sep. 13, 2023

(65) Prior Publication Data

US 2023/0421457 A1    Dec. 28, 2023

(30) Foreign Application Priority Data

Aug. 15, 2023    (CN) .......................... 202311021887.8

(51) Int. Cl.
*H04L 41/147*    (2022.01)
*G16Y 10/35*    (2020.01)
*G16Y 40/35*    (2020.01)

(52) U.S. Cl.
CPC ............ *H04L 41/147* (2013.01); *G16Y 10/35* (2020.01); *G16Y 40/35* (2020.01)

(58) Field of Classification Search
None
See application file for complete search history.

(56) References Cited

U.S. PATENT DOCUMENTS

2020/0031332 A1    1/2020    Koti et al.
2021/0180970 A1    6/2021    Park
(Continued)

FOREIGN PATENT DOCUMENTS

| CN | 111327706 A | 6/2020 |
| CN | 111563028 A | 8/2020 |
| CN | 112747477 A | 5/2021 |

(Continued)

OTHER PUBLICATIONS

Notification to Grant Patent Right for Invention in Chinese Application No. 202311021887.8 dated Oct. 13, 2023, 4 pages.
(Continued)

*Primary Examiner* — Walter J Divito
(74) *Attorney, Agent, or Firm* — METIS IP LLC (57) ABSTRACT

The present disclosure provides a method and system for hierarchical processing of gas data based on smart gas Internet of Things (IoT). The method is executed via the smart gas IoT. The method includes obtaining gas data sending and receiving information of at least one node in at least one period. The method also includes predicting a gas data communication load of the at least one node in at least one future period based on the gas data sending and receiving information. The method further includes determining a time-sharing processing scheme for the at least one future period based on the gas data communication load of the at least one node in the at least one future period.

8 Claims, 4 Drawing Sheets

(56) References Cited

U.S. PATENT DOCUMENTS

2023/0039273 A1* 2/2023 Zafirovic-Vukotic ........................
H04L 41/16
2023/0244965 A1* 8/2023 Kumar .................. G06N 3/045
702/3

FOREIGN PATENT DOCUMENTS

| CN | 113516279 A | 10/2021 |
| --- | --- | --- |
| CN | 114580922 A | 6/2022 |
| CN | 115330094 A | 11/2022 |
| CN | 115356978 A | 11/2022 |
| CN | 115358461 A | 11/2022 |
| CN | 115512520 A | 12/2022 |
| CN | 115545231 A | 12/2022 |
| CN | 115614678 A | 1/2023 |
| CN | 115631066 A | 1/2023 |
| CN | 115640915 A | 1/2023 |
| CN | 115681828 A | 2/2023 |
| CN | 115796408 A | 3/2023 |
| CN | 116011647 A | 4/2023 |
| CN | 116109104 A | 5/2023 |
| CN | 116258347 A | 6/2023 |
| CN | 116341740 A | 6/2023 |
| CN | 116368355 A | 6/2023 |
| CN | 116498908 A | 7/2023 |
| CN | 116503229 A | 7/2023 |
| CN | 116506470 A | 7/2023 |
| CN | 116539128 A | 8/2023 |

OTHER PUBLICATIONS

First Office Action in Chinese Application No. 202311021887.8 dated Sep. 15, 2023, 17 pages.
Wan, Zhentian et al., Analysis and Thinking on the Key Technologies of Gas Turbine Operation and Maintenance, Energy Research and Management, 111-114, 2020.
Zhi, Xiaoye et al., Research on Technical Transformation Scheme of Intelligent Pipe Network, City Gas, 2013, 7 pages.
Fang, Rui et al., Color Code for SCADA System of City Gas Pipe Network, Gas & Heat, 2013, 4 pages.

* cited by examiner

METHODS AND SYSTEMS FOR HIERARCHICAL PROCESSING OF GAS DATA BASED ON SMART GAS INTERNET OF THINGS

CROSS-REFERENCE TO RELATED APPLICATIONS

This application claims priority to Chinese Application No. 202311021887.8, filed on Aug. 15, 2023, the entire contents of which are incorporated herein by reference.

TECHNICAL FIELD

The present disclosure relates to the field of data management, and in particular, to methods and systems for hierarchical processing of gas data based on smart gas Internet of Things.

BACKGROUND

Nowadays, a gas data processing operation is mainly undertaken by a gas data center. The gas data processing operation includes receiving and sending gas data, analyzing data, etc. With an increasing volume of gas data, a processing capacity of some nodes in the gas datacenter is gradually insufficient, which leads to increasing loads on the gas datacenter and increasing demands on a communication load capacity of the gas data center.

Aiming at a problem of allocating and processing the gas data, CN111563028A provides a method for predicting a task scale of a data center based on temporal data analysis. The method focuses on input data features of different data centers to make a reasonable prediction of a task scale of a data center, and to reasonably schedule resources for the data center. However, the method does not consider an impact of the load of the datacenter itself on the communication load of the datacenter.

Therefore, the present disclosure provides a method and system for hierarchical processing of gas data based on smart gas Internet of Things, which helps to rationally allocate resources based on a load condition of a data center.

SUMMARY

One of the embodiments of the present disclosure provides a method for hierarchical processing of gas data based on smart gas Internet of Things (IoT), and the method is executed via the smart gas IoT. The method includes obtaining gas data sending and receiving information of at least one node in at least one period. The method also includes predicting a gas data communication load of the at least one node in at least one future period based on the gas data sending and receiving information. The method further includes determining a time-sharing processing scheme in the at least one future period based on the gas data communication load of the at least one node in the at least one future period.

One embodiment of the present disclosure provides a system for hierarchical processing of gas data based on smart gas Internet of Things (IoT). The smart gas Internet of Things is configured to obtain gas data sending and receiving information of at least one node in at least one period. The smart gas Internet of Things is also configured to predict, based on the gas data sending and receiving information, a gas data communication load of the at least one node in at least one future period. The smart gas Internet of Things is further configured to determine a time-sharing processing scheme in the at least one future period based on the gas data communication load of the at least one node in the at least one future period.

One of the embodiments of the present disclosure provides a non-transitory computer-readable storage medium storing computer instructions. When a computer reads the computer instructions in the storage medium, the computer performs the method as described in any one of the above.

Some embodiments of the present disclosure include at least the following beneficial effect: a load situation of a node may be fully considered by determining gas data communication load of the node in a future period, so that a time-sharing processing scheme is more in line with an actual situation, thereby realizing a purpose of optimizing data processing efficiency of a smart gas datacenter.

BRIEF DESCRIPTION OF THE DRAWINGS

The present disclosure may be further illustrated by way of exemplary embodiments, which may be described in detail by means of the accompanying drawings. These embodiments are not limiting, and in these embodiments the same numbering indicates the same structure, wherein.

DETAILED DESCRIPTION

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

Figure 1:
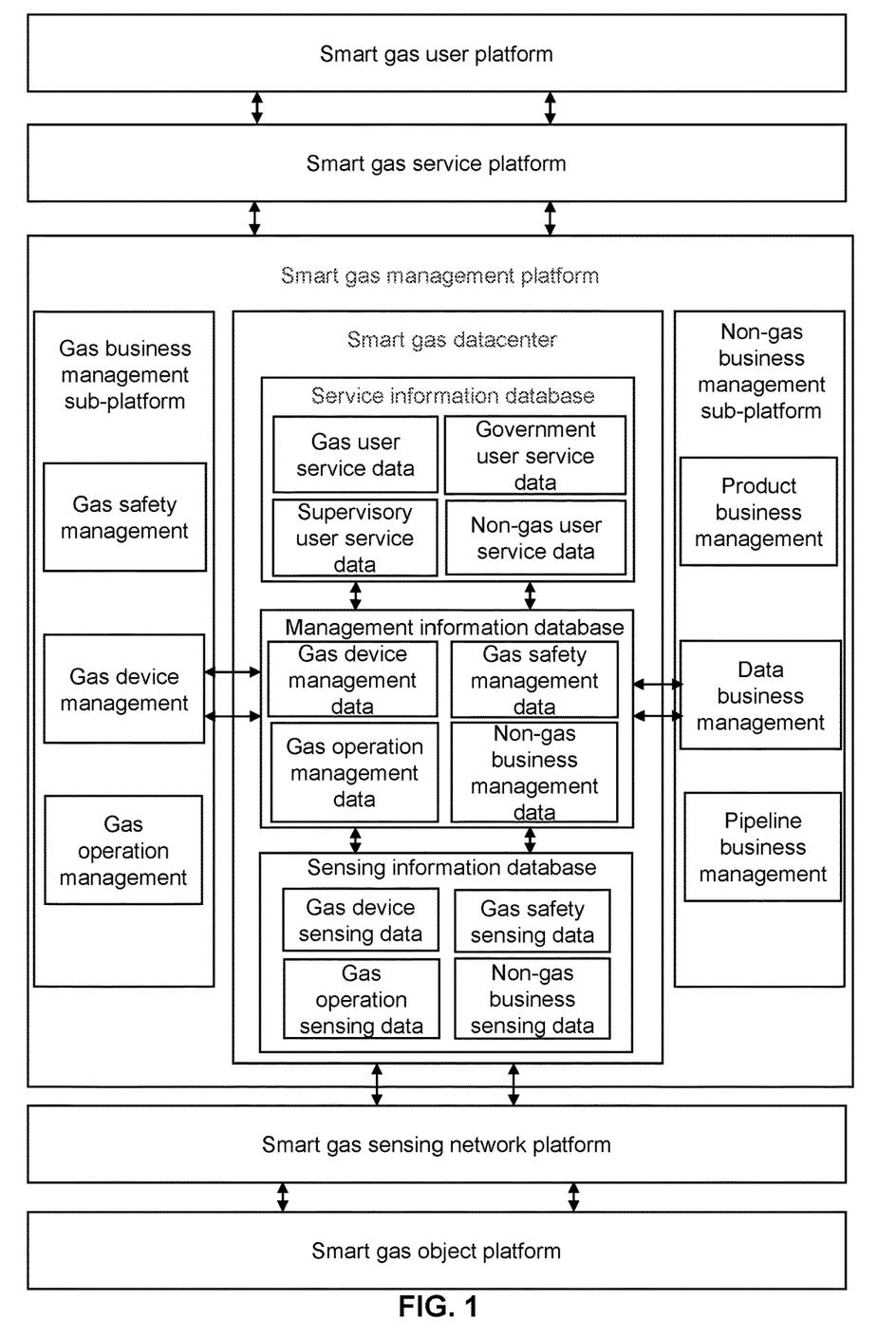
FIG. 1 is a schematic diagram illustrating a platform structure of a system for hierarchical processing of gas data based on smart gas Internet of Things according to some embodiments in the present disclosure.

FIG. 1 is a schematic diagram illustrating a platform structure of a system for hierarchical processing of gas data based on smart gas Internet of Things according to some embodiments in the present disclosure. It should be noted that the following embodiments are only for the purpose of explaining the present disclosure and do not constitute a limitation of the present disclosure.

As shown in FIG. 1, the system for the hierarchical processing of the gas data based on the smart gas Internet of Things (IoT) (hereinafter referred to as the system for hierarchical processing of gas data) includes a smart gas user platform, a smart gas service platform, a smart gas management platform, a smart gas sensing network platform, and a smart gas object platform interacting in sequence.

The smart gas user platform refers to a platform used to interact with a user. In some embodiments, the smart gas user platform may be configured as a terminal device.

A smart gas service platform refers to a platform that provides information or data transmission and interaction. For example, the smart gas service platform may obtain gas data sending and receiving information, etc., from the smart gas management platform and send the gas data sending and receiving information to the smart gas user platform.

The smart gas management platform refers to a platform that coordinates a connection and collaboration between various functional platforms and provides functions of sensing management and control management.

In some embodiments, the smart gas management platform may include a gas business management sub-platform, a non-gas business management sub-platform, and a smart gas data center.

The gas business management sub-platform refers to a platform used to process information related to a gas business. In some embodiments, the gas business management sub-platform may be used to perform gas safety management, gas device management, and gas operation management.

The non-gas business management sub-platform refers to a platform used to process information related to a non-gas business. In some embodiments, the non-gas business management sub-platform may be used to perform product business management, data business management, and channel business management.

The smart gas data center may be used to store and manage operational information of the system for the hierarchical processing of the gas data. In some embodiments, the smart gas data center may be configured as a storage device used to store data related to gas information.

In some embodiments, the smart gas datacenter includes at least one datacenter sub-platform, and each node corresponds to a datacenter sub-platform. At least one node (or the at least one data center sub-platform) may be arranged in a centralized manner or a distributed manner.

In some embodiments, the smart gas datacenter (or each datacenter sub-platform) may include a service information database, a management information database, and a sensing information database.

The service information database may be used to store data related to smart gas service information, such as gas user service data, government user service data, supervisory user service data, non-gas user service data, etc. The management information database may be used to store data related to smart gas management information, such as gas device management data, gas safety management data, gas operation management data, non-gas business management data, etc. The sensing information database may be used to store data related to smart gas sensing information, such as gas device sensing data, gas safety sensing data, gas operation sensing data, non-gas business sensing data, etc.

The management information database interacts bi-directionally with the sensing information database and the service information database respectively. The sensing information database interacts with the smart gas sensing network platform, and the service information database interacts with the smart gas service platform. The gas business management sub-platform and the non-gas business management sub-platform perform an information interaction with the management information database respectively, obtain corresponding management data from the management information database, and send a management instruction to the management information database. The management information database further sends the management data to the service information database or the sensing information database according to an instruction requirement to realize an external transmission of information.

In some embodiments, the smart gas management platform may perform the information interaction with the smart gas service platform and the smart gas sensing network platform through the smart gas data center, respectively. The smart gas data center realizes sending and receiving data by interacting with another smart gas platform. For example, the smart gas data center may send gas user service data to the smart gas service platform. As another example, the smart gas datacenter may send an instruction of obtaining the government user service data to the smart gas sensing network platform to obtain the government user service data.

The smart gas sensing network platform is a functional platform used to manage sensing communication. In some embodiments, the smart gas sensing network platform may be configured as a communication network and a gateway to perform functions of sensing communication for sensing information and sensing communication for controlling information.

The smart gas object platform refers to a functional platform used to generate the sensing information and execute the controlling information. In some embodiments, the smart gas object platform may be configured as a gas device that stores data in the smart gas data center or reads data from the smart gas data center. An exemplary gas device includes but is not limited to, a gas meter, a valve control device, a gas flow meter, etc.

In some embodiments, based on the smart gas IoT system, a closed loop of information operation may be formed between the smart gas object platform and the smart gas user platform. The closed loop operates coordinately and regularly under an unified management of the smart gas management platform, thereby realizing informatization and intelligence of gas resource scheduling.

Figure 2:
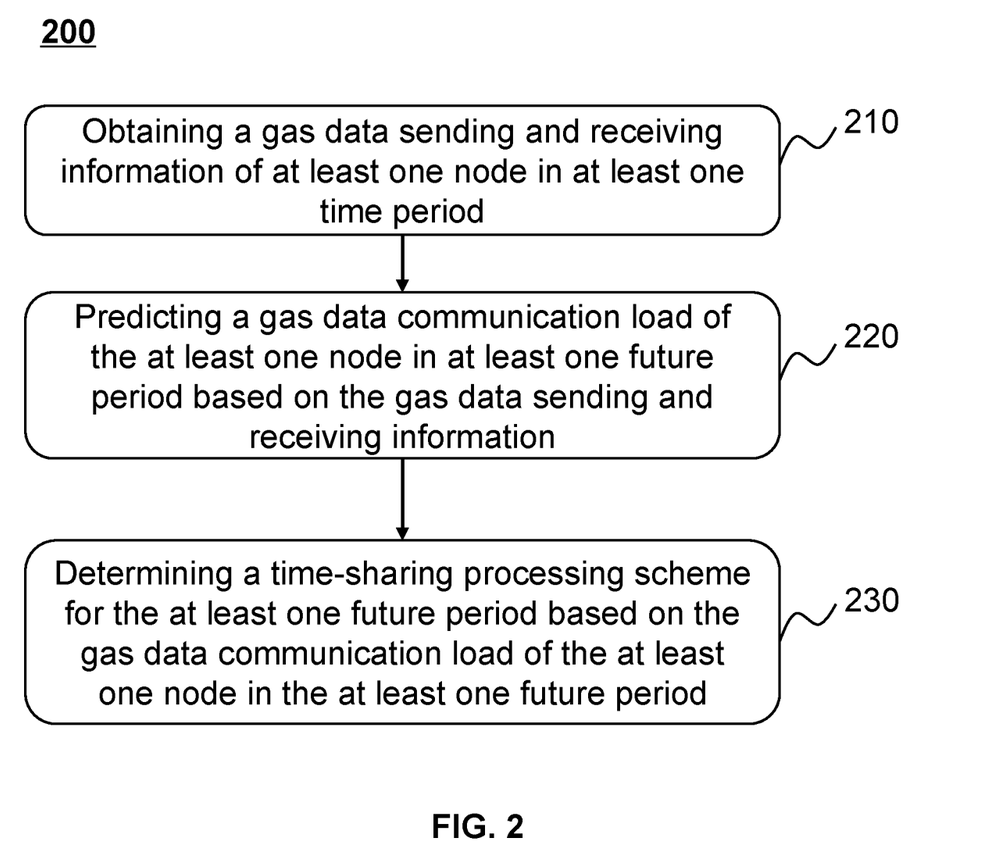
FIG. 2 is an exemplary flowchart illustrating a method for hierarchical processing of gas data based on smart gas Internet of Things according to some embodiments of the present disclosure.

FIG. 2 is an exemplary flowchart illustrating a method for hierarchical processing of gas data based on smart gas Internet of Things according to some embodiments of the present disclosure. In some embodiments, process 200 may be executed by the smart gas management platform. As shown in FIG. 2, the process 200 includes the following steps.

In 210, gas data sending and receiving information of at least one node in at least one time period may be obtained. The at least one time period may include a current period and a historical period.

A node refers to a datacenter sub-platform of a smart gas datacenter. In some embodiments, the smart gas management platform may obtain gas data information received and sent by each node through the smart gas data center. The gas data information may include a gas data type, data volume, a located region, etc.

The at least one time period may include a current period and at least one historical period.

The gas data receiving and sending information refers to gas data information sent and received by a node. For example, the gas data sending and receiving information of a node in a certain time period may include gas data information received and sent by the node in the time period. The received gas data information is referred to as received data. The sent gas data information is referred to as sent data.

In some embodiments, the gas data sending and receiving information may be determined by a sending and receiving record of data of the smart gas data center. The sending and receiving record of data may be recorded when the at least one node of the smart gas datacenter sends and receives data.

In 220, a gas data communication load of the at least one node in at least one future period may be predicted based on the gas data sending and receiving information.

The gas data communication load refers to data volume of gas data sent and received by a node in a time period. For example, the larger the data volume of the received and sent gas data, the greater the gas data communication load.

The gas data communication load may include a data receiving load and a data sending load. The data receiving load refers to data volume of the received data of a node in a certain time period. The data sending load refers to data volume of the sent data of the node in a certain time period.

In some embodiments, the smart gas management platform may determine a gas data communication load in the historical period based on data volume of gas data sent and received in the historical period, and determine the gas data communication load in the historical period that is in the same time period as the future period to be the gas data communication load in the future period.

In some embodiments, the gas data communication load includes a basic communication load and a floating communication load.

The basic communication load refers to a gas data communication load that may be determined in advance. For example, the basic communication load may be data volume of gas data fixedly received by the node. The fixedly received gas data may be a preset and specific type of gas data. As another example, the basic communication load may be data volume of gas data collected by a gas device and other data collection devices at a fixed collection frequency.

The floating communication load refers to a gas data communication load that cannot be determined in advance. For example, the floating communication load may be data volume that fluctuates according to time variations (e.g., variations such as a peak period, a trough period, etc.). As another example, the floating communication load may be data volume of gas data collected by the gas device and other data collection devices when the collection frequency is changed.

A variation factor may include a date, weather, a gas supply peak period, whether it is an inspection or maintenance period, etc. For example, the collection frequency of the gas device and other data collection devices may increase with an increased severity of weather. As another example, the peak period and the trough period of different dates and different times are different. More gas devices are turned on during the peak period, which includes more gas locations that need to be monitored and used to obtain data, and more reported repair data. Data volume of collected data of a collection device that is fixedly turned on in the peak period and the trough period is the basic communication load. Data volume of collected data of a collection device that is turned on or turned off in different time periods is the floating communication load.

As another example, since risks and failure probabilities at different locations in a gas pipeline network are different, inspection or maintenance cycles of different locations in the gas pipeline network may also be different. Data volumes and data generation times may be different when an inspection or maintenance is performed at different locations in the pipeline network based on an inspection scheme. Secondary inspections or online-offline linked inspections may be required at some locations, which may also cause differences in monitoring data or feedback data due to a failure detection result. Therefore, data generated by the inspection or maintenance in a certain time period is fluctuated, and data volume of a portion of the related data is the floating communication load.

In some embodiments, the smart gas management platform may determine the basic communication load of the at least one node in the at least one future period based on the gas data sending and receiving information by using a preset method, and determine the floating communication load of the at least one node in the at least one future period through a predictive model.

In some embodiments, the smart gas management platform may determine the basic communication load of a node by storing and analyzing gas data received by the node over a historical period (e.g., half a year, a year, etc.). For example, the smart gas management platform may designate data volume of collected data of a collection device with a constant collection frequency and/or data volume of collected data of a collection device that is fixedly turned on in the peak period and the trough period as the basic communication load.

In some embodiments, the basic communication load includes a basic receiving load.

The basic receiving load refers to a basic communication load corresponding to the received data.

In some embodiments, for any one of the at least one node, the smart gas management platform may classify at least one gas data received by the node in a first cycle of a first historical period, determine a stable degree of at least one type of gas data, determine at least one basic data type based on the stable degree, and determine the basic receiving load based on basic data volume corresponding to the at least one basic data type.

The first historical period is a longer duration, such as past six months, past year, etc. The duration of the first historical period may be longer than a first length threshold. The first length threshold may be manually preset or preset by a system.

The first cycle may be a time period that occurs periodically every certain period within the first historical period. For example, a period from 2:00 p.m. to 3:00 p.m. every day may be preset as the first cycle period, which occurs once every other day. The first cycle may be preset by an expert or by the system. The first historical period includes a plurality of first cycles.

In some embodiments, the smart gas management platform may perform a classification based on the gas data type and the located region. For example, the smart gas management platform may divide the gas data with the same type of gas data and the same located region into the same category. For example, the gas data type may include household gas usage, unit gas usage, government gas usage, etc.

The stable degree may reflect an occurrence frequency of a type of gas data in the first historical period. A higher stable degree indicates that the gas data occurs more frequently in the first historical period. A stable degree may be determined for each type of gas data. For example, a stable degree of a type of gas data may be determined by a ratio (e.g., M/N) of a total count of times M that node A receives the type of gas data in the first cycle of the first historical period to a total count of times N that the first cycle occurs periodically within the first historical period.

A basic data type may be a gas data type corresponding to a type of gas data whose stable degree is greater than a stable degree threshold. The smart gas management platform may designate the gas data type corresponding to the type of gas data whose stable degree is greater than the stable degree threshold as the basic data type. The stable degree threshold may be set based on previous knowledge or historical data.

The basic data volume may be data volume corresponding to the basic data type. For example, the basic data volume may be data volume corresponding to a type of gas data that belongs to the basic data type.

In some embodiments, the smart gas management platform may determine a minimum value of the data volume of the type of gas data belonging to the basic data type, which is received by the node in a plurality of first cycles of the first historical period, as the basic data volume of the basic data type.

In some embodiments, the smart gas management platform may designate a sum of the basic data volume corresponding to the basic data types as the basic receiving load.

In some embodiments, more accurate basic receiving load data may be obtained by analyzing the stable degree of the gas data and determining the basic receiving load, thereby improving rationality of data.

In some embodiments, the basic receiving load further includes data receiving volume of a node in the first cycle of a second historical period. In some embodiments, the smart gas management platform may determine the data receiving volume of the node in the first cycle of the second historical period through a preset rule.

The second historical period is relatively short, such as past week, past half month, etc. The second historical period may be less than a second length threshold. The second length threshold may be manually preset or present by the system. The second historical period is less than the first historical period. The second length threshold is less than or equal to the first length threshold. The second historical period includes a plurality of first cycles.

Since the node receives part of the gas data that needs to be processed in the historical period, the part of the gas data (which is referred to as data to be processed hereinafter) may be sent in a future idle time period. For example, the node may divide the data to be processed into a plurality of data packets, and assign the plurality of data packets to be sent in different future periods.

In some embodiments, the preset rule may include determining the data receiving volume of the node in the first cycle of the second historical period based on an allocation rule of the data to be processed.

In some embodiments, the processing performed during an idle period reduces a data processing load on the node and reduces a possibility of downtime, thereby allowing a better operation. the data receiving volume may be determined more accurately by determining the data receiving volume of a node based on a preset rule, which improves accuracy and rationality of prediction.

In some embodiments, the smart gas management platform may determine the floating communication load of the at least one node in the at least one future period through the predictive model. The predictive model may be a machine learning model such as a neural network model, etc.

In some embodiments, the smart gas management platform may determine the data receiving volume and data sending volume of the at least one node in the at least one future period through the predictive model. In some embodiments, the smart gas management platform may designate a result of subtracting the basic communication load of the node from a sum of the data receiving volume and the data sending volume of any node in any future period as the floating communication load of the node in a corresponding future period.

In some embodiments, an input of the predictive model may be gas pipeline inspection information for at least one time period, a gas pipeline construction design drawing, seasonal data, a reception fluctuation degree of the at least one node, and an importance level of the at least one node. An output of the predictive model may include the data receiving volume and the data sending volume of the at least one node in the at least one future period. More description regarding the gas pipeline inspection information, the gas pipeline construction design drawing, the seasonal data, the reception fluctuation degree, and the importance level may be found in FIG. 3 and the related descriptions thereof.

In some embodiments, a training sample of the predictive model may include sample gas pipeline inspection information in at least one sample time period, a sample gas pipeline construction design drawing, sample seasonal data, a sample reception fluctuation degree of the at least one node, and a sample importance level of the at least one node, and the training sample may be determined based on historical data. A Label refers to historical data receiving volume and historical data sending volume of the at least one node in a time period after the sample time period. The training sample and the label may be determined based on the historical data.

In some embodiments, the predictive model may also be a machine learning model with a self-defined structure. In some embodiments, the predictive model includes an inspection feature extraction layer, a location distribution feature extraction layer, a data receiving prediction layer, and a data sending prediction layer. More details regarding the predictive model may be found in FIG. 3 and the related descriptions thereof.

In some embodiments, the basic communication load and the floating communication load of a node may be determined separately to improve an accuracy of determining the gas data communication load, thereby planning and allocating resources better to improve the stable degree and the reliability of the smart gas datacenter.

In 230: a time-sharing processing scheme in the at least one future period may be determined based on the gas data communication load of the at least one node in the at least one future period.

The time-sharing processing scheme is an allocation scheme for at least one node to process the gas data. The processing the gas data includes receiving the gas data and sending the gas data.

In some embodiments, the time-sharing processing scheme includes data processing volume of the at least one node in the at least one future period. The data processing volume includes the data receiving volume and the data sending volume.

In some embodiments, the smart gas management platform may determine whether a gas data communication load in the future period exceeds a load threshold, and in response to a determining that the gas data communication load does not exceed the load threshold, the node is normally controlled to send and receive data. In some embodiments, in response to a determining that the gas data communication load exceeds the load threshold, the smart gas management platform may also control the node to stop sending and receiving data in a corresponding future period and control the node to restart sending and receiving data in a next future period of the corresponding future period under a condition that the gas data communication load in the next future period does not exceed the load threshold. More detailed descriptions regarding the load threshold may be found in FIG. 4 and the related descriptions thereof.

In some embodiments, the smart gas management platform may determine the time-sharing processing scheme in the at least one future period based on a data processing capacity of the at least one node and the gas data communication load of the at least one node in the at least one future period. More details regarding determining the time-sharing processing scheme may be found in FIG. 4 and the related descriptions thereof.

In some embodiments, a load situation of a node may be fully considered by determining the gas data communication load of the node in the future period, so that the time-sharing processing scheme is more in line with an actual situation, thereby realizing a purpose of optimizing data processing efficiency of the smart gas datacenter.

It should be noted that the above descriptions of the process are only for illustration and description, and do not limit the scope of application of the present disclosure. For those skilled in the art, various modifications and changes may be made to the process under the guidance of the present disclosure. However, these modifications and changes are still within the scope of the present disclosure.

Figure 3:
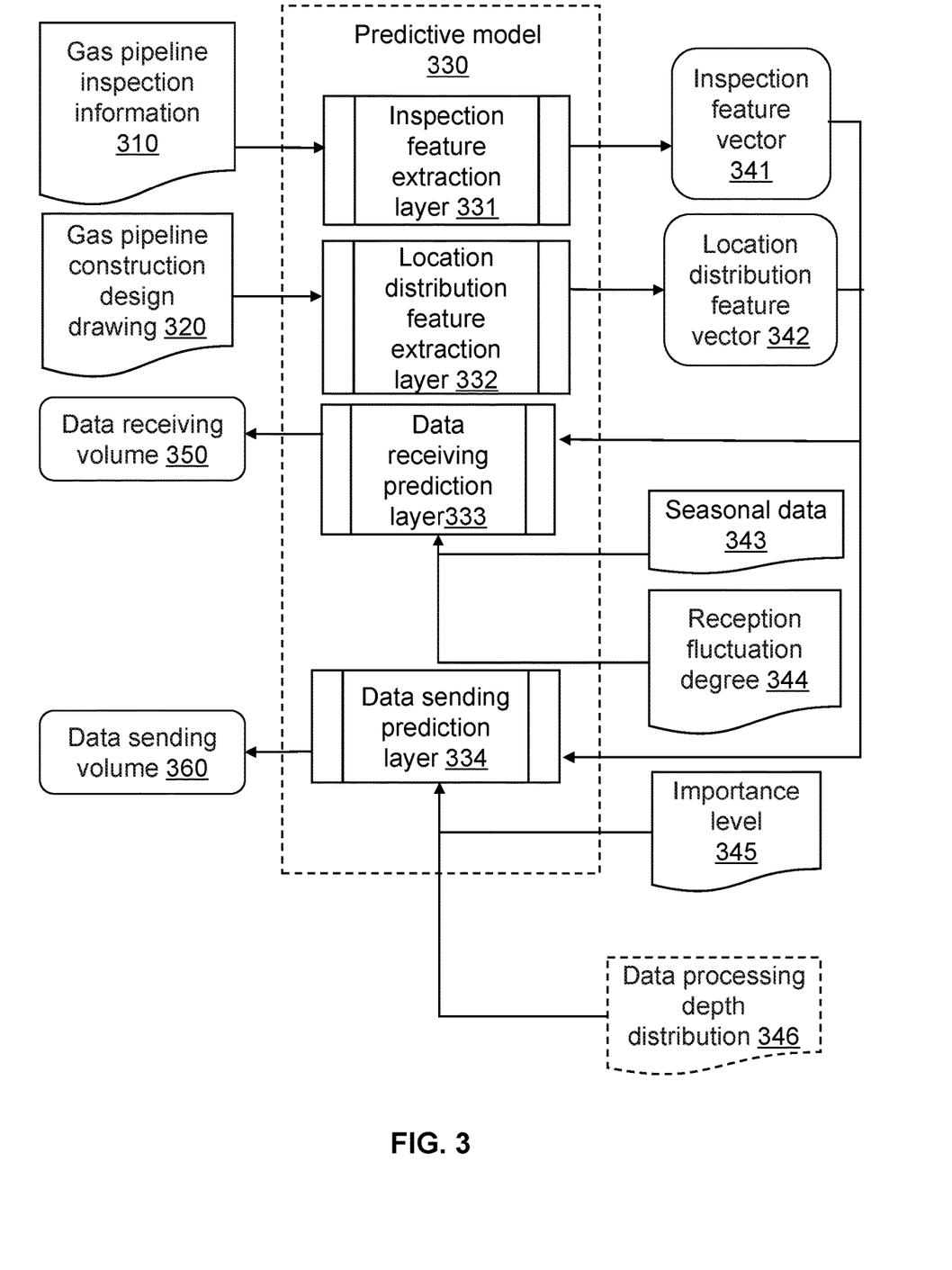
FIG. 3 is a schematic diagram illustrating an exemplary application of a predictive model according to some embodiments of the present disclosure.

FIG. 3 is a schematic diagram illustrating an exemplary application of a predictive model according to some embodiments of the present disclosure.

In some embodiments, the predictive model 330 may include an inspection feature extraction layer 331, a location distribution feature extraction layer 332, a data receiving prediction layer 333, and a data sending prediction layer 334.

Outputs of the inspection feature extraction layer 331 and the location distribution feature extraction layer 332 are designated as inputs of the data receiving prediction layer 333 and the data sending prediction layer 334. Outputs of the data receiving prediction layer 333 and the data sending prediction layer 334 are designated as a final output of the predictive model 330.

In some embodiments, an input of the inspection feature extraction layer 331 may include gas pipeline inspection information 310 in at least one time period, and an output of the inspection feature extraction layer 331 may include an inspection feature vector 341. The inspection feature extraction layer 331 may be a neural network model, etc.

The gas pipeline inspection information is information related to inspecting gas pipelines. For example, the gas pipeline inspection information may include a pipeline location, a pipeline inspection time, a pipeline inspection type, etc. Data obtained based on a historical inspection and/or maintenance result may be different due to different inspection/maintenance cycles at different locations in a pipeline network, and different data volumes and times when an inspection/maintenance is performed based on an inspection scheme. Secondary inspections or online-offline linked inspections are required at some locations, which may also cause differences in data volumes due to a failure detection result.

The gas pipeline inspection information may be uploaded and obtained by inspection personnel.

The inspection feature vector is a feature vector related to the gas pipeline inspection information.

In some embodiments, an input of the location distribution feature extraction layer 332 may include the gas pipeline construction design drawing 320, and an output of the location distribution feature extraction layer 332 may include the location distribution feature vector 342. The location distribution feature extraction layer 332 may be a convolutional neural network model, etc.

The gas pipeline construction design drawing includes a location distribution of gas pipelines in the gas pipeline network.

The gas pipeline construction design drawing may be determined based on design drawing information uploaded by a construction unit. Different locations in the gas pipeline network have different failure risks. The higher the failure risk, the inspection or maintenance cycles are different, corresponding generated data volumes are also different. Therefore, a location of the inspection pipeline in the pipeline network and a distribution of pipelines in a surrounding region need to be obtained, thereby making the prediction more accurate.

The location distribution feature vector may be a feature vector indicating a location of the gas pipeline in the gas pipeline network and a distribution of surrounding pipelines.

In some embodiments, an input of the data receiving prediction layer 333 may include the inspection feature vector 341, the location distribution feature vector 342, the seasonal data 343, and the reception fluctuation degree 344 of at least one node, and an output of the data receiving prediction layer 333 may include data receiving volume of the at least one node within the at least one future period 350. The data receiving prediction layer 333 may be a neural network model, etc.

The seasonal data is climate-related data.

The seasonal data may be determined by visiting a weather channel website for relevant climate data. Since the data receiving volume of gas data varies with seasons, a collection frequency of a gas device and other data collection devices may be correlated to a current climate condition. For example, the collection frequency may be reduced under a good climatic condition, the collection frequency may be increased under a poor climatic condition, etc.

The reception fluctuation degree may reflect a variation degree of the data receiving volume of a node. A greater reception fluctuation degree indicates a greater variation degree of the data receiving volumes of the node received multiple times in a time period.

For example, the greater the floating communication load of a node, the greater the reception fluctuation degree of the node.

In some embodiments, the smart gas management platform may determine the reception fluctuation degree of a node by solving a standard deviation or variance based on the data receiving volume of the node in a past time period. For example, the greater the standard deviation or variance of the data receiving volume of the node received multiple times in the time period, the greater the reception fluctuation degree of the node.

In some embodiments, the smart gas management platform determines fluctuation data volume in a second cycle based on the data receiving volume and the basic data volume in the second cycle of a third historical period of the at least one node, and determines a reception fluctuation degree of the at least one node based on the fluctuation data volume in the second cycle.

The third historical period is a time period in the past. The third historical period may be preset by an expert or by the system. The first historical period, the second historical period, and the third historical period may be different in duration. No specific provision regarding a duration in the third historical period is provided. The third historical period includes a plurality of second cycles.

The second cycle may be a period that occurs at regular intervals in the third historical period. For example, 8:00 a.m. to 10:00 a.m. for each day may be preset as the second cycle, and then the second cycle occurs every other day. The second cycle may be preset by an expert or by the system. The second cycle may be the same as or different from the first cycle.

More details regarding the data receiving volume and the basic data volume may be found in FIG. 2 and the related descriptions thereof.

The fluctuation data volume is remaining data volume after subtracting the basic data volume from the data receiving volume of a node in a plurality of second cycles of the third historical period. For example, if the third historical period is three days and the second cycle is a certain time period of each day, the fluctuation data volume (A1-B1, A2-B2, A3-B3) of node A may be obtained by subtracting the basic data volume (B1, B2, B3) of node A of each day from the data receiving volume (A1, A2, A3) of node A of each day.

In some embodiments, the smart gas management platform may determine a mean value and a standard deviation of the fluctuation data volume received by a node in a time period as the fluctuation degree of the receiving volume of the node.

In some embodiments, the reception fluctuation degree of each node may be considered effectively by determining the reception fluctuation degree of the node based on the fluctuation data volume of the node in a time period, thereby making a predicted data receiving volume more accurate.

In some embodiments, an input of the data sending prediction layer 334 may include the inspection feature vector 341, the location distribution feature vector 342, and the importance level 345 of the at least one node. The output of the data sending prediction layer 334 may include the data sending volume 360 of the at least one node within the at least one future period. The data sending prediction layer 334 may be a neural network model, etc.

The importance level of a node may reflect a complexity level of data processing performed by the node. A higher importance level indicates a higher complexity level of data processing performed by the node. The complexity level of data processing includes a depth of data processing, a count of data types that are able to be processed, etc. The importance level of the node may be obtained based on previous knowledge or historical data.

In some embodiments, the importance level of the at least one node is related to a data processing permission of the at least one node and the data receiving volume, the data forwarding volume, and the data processing volume of the at least one node in the third cycle.

The data processing permission is a limitation that reflects a scope of a node in processing the gas data. A node with a greater data processing permission may have a stronger comprehensive analysis capability and a more complex function but may have fewer data packets to be sent out after the processing.

The third cycle may be a time period that occurs at intervals. For example, the third cycle may be every minute, every half-minute, etc. The third cycle may be preset by an expert. The third cycle is shorter than the first cycle and the second cycle.

The data forwarding volume is the data volume that is forwarded without data analysis. The data forwarding refers to a process of sending out the received gas data without any data analysis and processing.

In some embodiments, the smart gas management platform may determine the data forwarding volume of a node in a time period based on a type of gas data received by the node. For example, a correspondence between different gas data types and whether data analysis is required may be preset, whether the gas data received by the node needs the data analysis may be determined based on the correspondence, and then the data forwarding volume may be determined based on a difference between the data receiving volume of the node and data volume for data analysis.

The data processing volume is the data volume for data analysis.

In some embodiments, the smart gas management platform may determine the data processing volume of a node in a period of time based on the type of gas data received by the node. For example, whether the gas data received by the node requires data analysis is determined based on the correspondence between different gas data types and whether the data analysis is required, so that the data processing volume is determined.

In some embodiments, the importance level of the at least one node may be positively related to a data processing authority range of the at least one node, the data receiving volume, the data forwarding volume, and the data processing volume of the at least one node in the third cycle.

In some embodiments, the importance level of the node is determined based on the data processing authority range of the node, the data receiving volume, the data forwarding volume, and the data processing volume of the node, which achieves an accurate prediction of the importance level of the node, thereby making a predicted data sending volume more accurate, managing resources of the smart gas datacenter better, and optimizing data transmission and processing.

In some embodiments, the input of the data sending prediction layer 334 further includes a data processing depth distribution 346 of the at least one node.

A data processing depth reflects a processing degree that a node performs data processing on gas data of at least one data type before data transmission. The data processing depth distribution includes a plurality of data processing depths. Different data processing depths correspond to processing degrees of different nodes that perform the data processing on the gas data of the at least one data type.

In some embodiments, the smart gas management platform may determine the data processing depth distribution of a node based on a utilization degree of computing resources, task durations of various types of gas data, and a gas data type of the node by using a preset relationship. In some embodiments, the preset relationship may be a correspondence between different data processing depths and different utilization degrees of computing resources, different task durations, and different gas data types.

In some embodiments, the smart gas management platform may determine the data processing depth distribution of a node based on the importance level of the node, the utilization degree of computing resources, the task duration of the gas data, and the gas data type by using a preset relationship. In some embodiments, the preset relationship may be a correspondence between different data processing degrees and different importance levels of different nodes, different utilization degrees of computing resources, different task durations, and different gas data types.

The preset relationship may be determined based on a previous knowledge or historical data.

The task durations of different types of gas data may be determined based on a calculation of historical data. The utilization degree of computing resources of a node is a ratio of data processing volume of the node within a current unit time to a data processing capacity of the node.

In some embodiments, a data processing depth distribution of the at least one node is designated as the input of the data sending prediction layer, which considers an effect of node processing data on the data sending volume and make the predicted data sending volume more comprehensive and accurate.

In some embodiments, the inspection feature extraction layer 331, the location distribution feature extraction layer 332, the data receiving prediction layer 333, and the data sending prediction layer 334 may be obtained by a joint training. More details regarding a training sample and a label may be found in FIG. 2 and the related descriptions thereof.

An exemplary joint training process includes the following operations. Sample gas pipeline inspection information in at least one sample time period is input into an initial inspection feature extraction layer to obtain an inspection feature vector output from the initial inspection feature extraction layer. Sample gas pipeline construction design drawing is input into an initial location distribution feature extraction layer to obtain a location distribution feature vector output from the location distribution feature extraction layer. Outputs of the inspection feature extraction layer and the location distribution feature extraction layer that are determined as a training sample data, sample seasonal data, and a sample reception fluctuation degree are input into an initial data receiving prediction layer to obtain data receiving volume of at least one node in a time period after the sample time period output from the initial data receiving prediction layer. Outputs of the initial inspection feature extraction layer and the initial location distribution feature extraction layer that are determined as a training sample data, a sample importance level of the at least one node, and sample data processing depth distribution of the at least one node are input into the initial data sending prediction layer to obtain data sending volume of the at least one node in a time period after the sample time period output from the initial data sending prediction layer. A loss function is constructed based on the label, the output of the initial data receiving prediction layer, and the output of the initial data sending prediction layer. Parameters of the initial data receiving prediction layer, the initial data sending prediction layer, the initial inspection feature extraction layer, and the initial location distribution feature extraction layer are synchronously updated. A trained data receiving prediction layer 333, a trained data sending prediction layer 334, a trained inspection feature extraction layer 331, and a trained location distribution feature extraction layer 332 are obtained by updating the parameters.

In some embodiments, parameters of a predictive model obtained through the joint training is beneficial for solving a problem of difficulty in obtaining the labels when the inspection feature extraction layer and the location distribution feature extraction layer are trained individually under some conditions, which also enables the inspection feature extraction layer and the location distribution feature extraction layer to better obtain the inspection feature vector and the location distribution feature vector, thereby improving training efficiency and accuracy.

The gas pipeline inspection information and the gas pipeline construction design drawing are processed through the predictive model, so that a self-learning ability of a machine learning model may be utilized to learn a rule from a large amount of gas inspection data, and a correlation of the data receiving volume and the data sending volume with the gas pipeline inspection information and the gas pipeline construction design drawing, thereby improving accuracy and efficiency in predicting the data receiving volume and the data sending volume.

Figure 4:
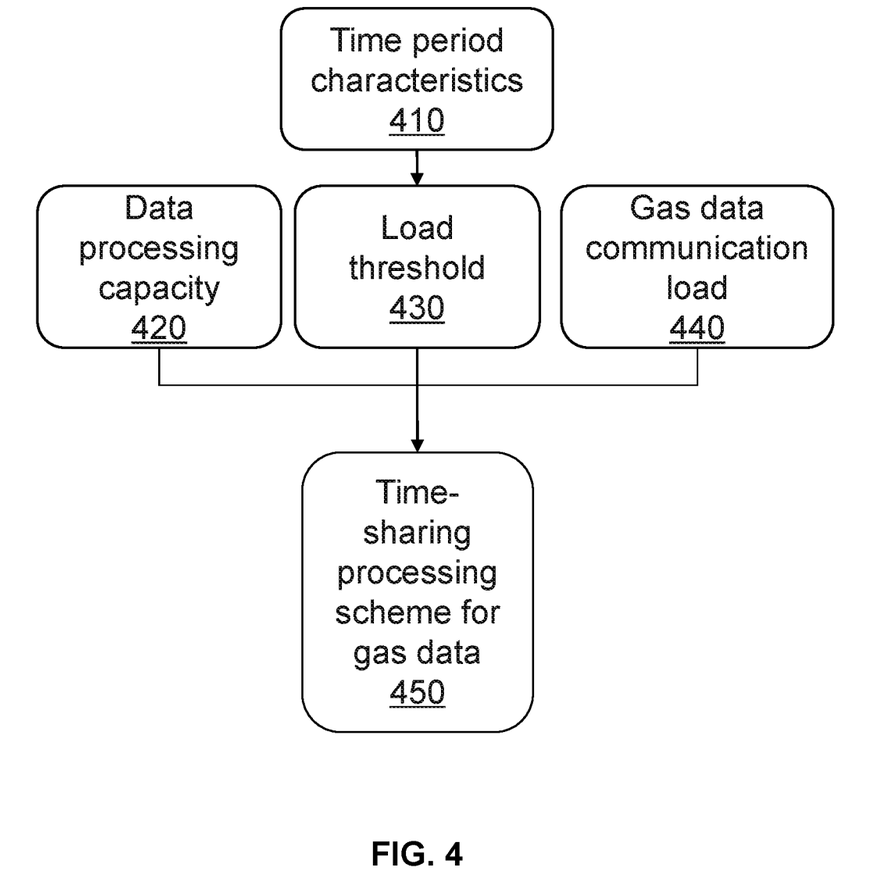
FIG. 4 is a schematic diagram illustrating an exemplary process of determining a time-sharing processing scheme according to some embodiments of the present disclosure.

FIG. 4 is a schematic diagram illustrating an exemplary process of determining a time-sharing processing scheme according to some embodiments of the present disclosure.

In some embodiments, the smart gas management platform may obtain a data processing capacity of at least one node, and determine the time-sharing processing scheme 450 for at least one future period based on the data processing capacity 420 of the at least one node, gas data communication load 440 of the at least one node in the at least one future period by using a preset algorithm.

The data processing capacity is data processing volume of a node per unit time. For example, the more data a node processes per unit time, the stronger the data processing capacity of the node.

The data processing capacity may be determined by analysis and statistics through the smart gas management platform.

More details regarding the gas data communication load may be found in FIG. 2 and the related descriptions thereof.

In some embodiments, the preset algorithm may include determining whether gas data communication load in a future period exceeds a load threshold, In response to a determining that the gas data communication load does not exceed the load threshold, the preset algorithm may include determining a processing allowance (e.g., data volume that may still be sent and received) of the node in the future period based on the gas data communication load of the node in the future period and the load threshold, and sending and receiving data in accordance with the processing allowance. Furthermore, in response to a determining that the gas data communication load exceeds the load threshold, the preset algorithm may include controlling the node to receive gas data in a corresponding future period, determining the processing allowance of the node in the future period based on the data receiving volume and the load threshold, and sending the data in accordance with the processing allowance. The load threshold is a threshold used to determine whether the gas data communication load is overloaded.

In some embodiments, the load threshold may be determined based on the data processing capabilities of a node. The greater the data processing capacity, the greater the load threshold.

In some embodiments, the preset algorithm may include determining whether the gas data communication load in the current period exceeds the load threshold based on the data processing capacity 420 of the at least one node, the gas data communication load 440 of the at least one node in the current period, and the load threshold 430. In response to a determining that the gas data communication load in the current period does not exceeds a load threshold, the at least one node is allocated data receiving volume and data sending volume based on a ratio of data processing capabilities of the at least one node. Furthermore, in response to a determining that the gas data communication load exceeds the load threshold in the current period, the preset algorithm may also include allocating the data receiving volume preferentially, and determining a remaining data processing capacity of the at least one node. The preset algorithm may further include allocating data volume to be sent in the current period based on the remaining data processing capacity.

In some embodiments, the load threshold 430 may also be set based on historical data.

In some embodiments, the load threshold 430 is related to time period characteristics 410.

The time period characteristics 410 are characteristics that reflect the gas data communication load in a time period. For example, a time period with higher gas data communication load volume is considered to be a peak period, and a time period with lower gas data communication load volume is considered to be a trough period, etc. The time period characteristics 410 may be determined through statistical analysis of historical data.

In some embodiments, the load threshold 430 may be larger when the time period characteristics 410 are peak periods, and the load threshold 430 may be smaller when the time period characteristics 410 are trough periods.

In some embodiments, the load threshold may be determined based on the time period characteristics to facilitate timely decentralized processing of data in a future period with higher data volume, thereby avoiding a data center downtime.

In some embodiments, when the gas data communication load in the current period is detected not to be overloaded, the smart gas management platform may allocate the data receiving volume and the data sending volume in the future period based on a ratio of the data processing capacity of each node to each node according to the ratio described hereinabove.

In some embodiments, the ratio of allocating the data receiving volume to the data sending volume is also related to an importance level of the at least one node. For example, the ratio is negatively related to the importance level of the at least one node.

More details regarding the importance level may be found in FIG. 3 and the related descriptions thereof.

In some embodiments, the smart gas management platform designates the importance level of a node as an influencing factor for the ratio, so that an important node is left with processing capacity, thereby avoiding a full load operation and reducing a downtime risk of the node.

In some embodiments, when the gas data communication load in the current period is detected to exceed the load threshold, the smart gas management platform may allocate the data receiving volume preferentially and determine remaining data processing capability of the at least one node. The allocation manner may be a proportional allocation manner. For example, the data receiving volume may be allocated preferentially in proportion to the at least one node. The remaining data processing capacity may be a difference between the data receiving volume and the load threshold.

In some embodiments, the smart gas management platform may allocate the data receiving volume to be sent in the current period based on the remaining data processing capacity of the at least one node.

The data volume to be sent is an amount of data that needs to be sent. Specifically, the data volume to be sent is an amount of data that a node needs to send in the current period.

In some embodiments, the smart gas management platform may send partial data of the data to be sent. In some embodiments, the smart gas management platform may determine actual data sending volume based on the load threshold and the remaining data processing capability of a node, and send the data in accordance with the actual data sending volume.

In some embodiments, the smart gas management platform may transfer unsent data volume of the data volume to be sent to another time period for sending. The unsent data volume is a difference between the data volume to be sent and the actual data sending volume. The another time period may be a recent trough period in the future period, etc.

In some embodiments, congestion in the smart gas data center may be alleviated by transferring the unsent data volume of the data volume to be sent to another time period for sending, so that data sending efficiency and stable degree may be improved.

In some embodiments, target data to be sent in the current period is related to the importance level or an urgency degree of at least one data type of the data to be sent in the current period. For example, the greater the importance level or the urgency degree of a data type, the higher the priority to be sent. The target data to be sent is actual data to be sent. The target data to be sent may be gas data of a data type with an importance level or an urgency degree greater than a corresponding degree threshold. The importance level or the urgency degree of the data type, and the degree threshold may be a preset value set by the system or a user.

In some embodiments, the urgency degree of the data type is designated as an influencing factor for the actual data to be sent in the current period, which allows staff to receive and process important or urgent information in a timely manner.

In some embodiments, received data is allocated in a certain way based on the data processing capacity of the node, the gas data communication load in the current period, and the load threshold in the current period, which may decentralize data processing, effectively reduce a communication pressure, and improve rationality of a scheme.

In some embodiments, the smart gas management platform determines the time-sharing processing scheme in the future period based on the data processing capacity of the node and the gas data communication load in the future period, so that data may be allocated more rationally, thereby reducing downtime probability of each node and the data center.

Some embodiments of the present disclosure provide a non-transitory computer-readable storage medium storing computer instructions. When a computer reads the computer instructions in the storage medium, the computer may perform the method for hierarchical processing of gas data based on the smart gas Internet of Things.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device. Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for hierarchical processing of gas data based on smart gas Internet of Things (IoT), wherein the method is executed via the smart gas IoT, and the method comprises:
    obtaining gas data sending and receiving information of at least one node in at least one period;
    predicting, based on the gas data sending and receiving information, a gas data communication load of the at least one node in at least one future period, wherein the gas data communication load includes a basic communication load and a floating communication load, including:
        determining, based on the gas data sending and receiving information, the basic communication load of the at least one node in the at least one future period through a preset method; and
        determining the floating communication load of the at least one node in the at least one future period through a predictive model, the predictive model being a machine learning model, wherein the predictive model includes an inspection feature extraction layer, a location distribution feature extraction layer, a data receiving prediction layer, and a data sending prediction layer, wherein an input of the inspection feature extraction layer is gas pipeline inspection information in the at least one period, and an output of the inspection feature extraction layer is an inspection feature vector; an input of the location distribution feature extraction layer is gas pipeline construction design drawing data, and an output of the location distribution feature extraction layer is a location distribution feature vector; an input of the data receiving prediction layer includes the inspection feature vector, the location distribution feature vector, seasonal data, a reception fluctuation degree of the at least one node, and an output of the data receiving prediction layer is data receiving volume of the at least one node within the at least one future period; and an input of the data sending prediction layer includes the inspection feature vector, the location distribution feature vector, an importance level of the at least one node, and an output of the data sending prediction layer is data sending volume of the at least one node within the at least one future period; and determining a time-sharing processing scheme for the at least one future period based on the gas data communication load of the at least one node in the at least one future period.

2. The method of claim 1, wherein the basic communication load comprises a basic receiving load;

the determining, based on the gas data sending and receiving information, the basic communication load of the at least one node in the at least one future period through a preset method comprises:

for any one of at least one node, classifying at least one gas data received by a node in a first cycle within a first historical period;

determining a stable degree of at least one type of gas data;

determining at least one basic data type based on the stable degree; and determining the basic receiving load based on basic data volume corresponding to the at least one basic data type.

3. The method of claim 2, wherein the basic receiving load comprises data receiving volume of the node in the first cycle within a second historical period, and the determining, based on the gas data sending and receiving information, the basic communication load of the at least one node in the at least one future period through a preset method comprises:

determining the data receiving volume of the node in the first cycle within the second historical period through a preset rule.

4. The method of claim 1, wherein determining the reception fluctuation degree of the at least one node comprises:

determining fluctuation data volume in a second cycle period based on the data receiving volume and the basic data volume of the second cycle period within a third historical period of the at least one node; and determining the reception fluctuation degree of the at least one node based on the fluctuation data volume in the second cycle period.

5. The method of claim 1, wherein the determining a time-sharing processing scheme for the at least one future period based on the gas data communication load of the at least one node in the at least one future period comprises:

obtaining data processing capability of the at least one node; and determining, based on the data processing capability of the at least one node and the gas data communication load of the at least one node in the at least one future period, the time-sharing processing scheme for the at least one future period through a preset algorithm, the time-sharing processing scheme comprising data processing volume of the at least one node in the at least one future period.

6. The method of claim 5, wherein the determining, based on the data processing capability of the at least one node and the gas data communication load of the at least one node in the at least one future period, the time-sharing processing scheme for the at least one future period through a preset algorithm comprises:

determining, based on the data processing capability of the at least one node, a gas data communication load of the at least one node in a current period, and a load threshold, whether the gas data communication load in the current period exceeds the load threshold;

in response to a determining that the gas data communication load in the current period does not exceed the load threshold, allocating the data receiving volume and the data sending volume to the at least one node based on a ratio, the ratio being a ratio of data processing capabilities of the at least one node; and in response to a determining that the gas data communication load exceeds the load threshold in the current period, allocating the data receiving volume preferentially, and determining remaining data processing capability of the at least one node; and allocating data volume to be sent in the current period based on the remaining data processing capability.

7. A system for hierarchical processing of gas data based on smart gas Internet of Things (IoT), wherein the smart gas IoT is configured to perform following operations:

obtaining gas data sending and receiving information of at least one node in at least one period;

predicting, based on the gas data sending and receiving information, a gas data communication load of the at least one node in at least one future period, wherein the gas data communication load includes a basic communication load and a floating communication load, including:

determining, based on the gas data sending and receiving information, the basic communication load of the at least one node in the at least one future period through a preset method; and determining the floating communication load of the at least one node in the at least one future period through a predictive model, the predictive model being a machine learning model, wherein the predictive model includes an inspection feature extraction layer, a location distribution feature extraction layer, a data receiving prediction layer, and a data sending prediction layer, wherein an input of the inspection feature extraction layer is gas pipeline inspection information in the at least one period, and an output of the inspection feature extraction layer is an inspection feature vector; an input of the location distribution feature extraction layer is gas pipeline construction design drawing data, and an output of the location distribution feature extraction layer is a location distribution feature vector; an input of the data receiving prediction layer includes the inspection feature vector, the location distribution feature vector, seasonal data, a reception fluctuation degree of the at least one node, and an output of the data receiving prediction layer is data receiving volume of the at least one node within the at least one future period; and an input of the data sending prediction layer includes the inspection feature vector, the location distribution feature vector, an importance level of the at least one node, and an output of the data sending prediction layer is data sending volume of the at least one node within the at least one future period; and determining a time-sharing processing scheme for the at least one future period based on the gas data communication load of the at least one node in the at least one future period.

8. The system of claim 7, wherein the smart gas IoT comprises a smart gas user platform, a smart gas service platform, a smart gas management platform, a smart gas sensing network platform, and a smart gas object platform interacting in sequence, the smart gas management platform at least comprises a smart gas datacenter, and the smart gas data center is configured to realize data sending and receiving by interacting with another smart gas platform; and the at least one node corresponds to at least one datacenter sub-platform of the smart gas datacenter, and the at least one datacenter sub-platform includes a service information database, a management information database, and a sensing information database.

* * * * *